US012751575B2

(12) United States Patent
Yekutiely et al.

(10) Patent No.: US 12,751,575 B2
(45) Date of Patent: Oct. 6, 2026

(54) FUEL GRATE FOR A GRILL

(71) Applicant: Shavit Yekutiely, Ramat Hasharon (IL)

(72) Inventors: Shavit Yekutiely, Ramat Hasharon (IL); Maya More, Ramat Hasharon (IL)

( * ) Notice: Subject to any disclaimer, the term of this patent is extended or adjusted under 35 U.S.C. 154(b) by 510 days.

(21) Appl. No.: 17/641,117

(22) PCT Filed: Sep. 10, 2020

(86) PCT No.: PCT/IL2020/050992

§ 371 (c)(1),
(2) Date: Mar. 8, 2022

(87) PCT Pub. No.: WO2021/048851

PCT Pub. Date: Mar. 18, 2021

(65) Prior Publication Data

US 2022/0330750 A1 Oct. 20, 2022

Related U.S. Application Data

(60) Provisional application No. 62/898,007, filed on Sep. 10, 2019.

(51) Int. Cl.
*A47J 37/07* (2006.01)
*F24B 15/00* (2006.01)

(52) U.S. Cl.
CPC ......... *A47J 37/0704* (2013.01); *A47J 37/079* (2013.01); *F24B 15/005* (2013.01)

(58) Field of Classification Search
CPC .... A47J 37/0704; A47J 37/079; F24B 15/005
USPC ............................................ 126/25 R, 152 R
See application file for complete search history.

(56) References Cited

U.S. PATENT DOCUMENTS

| | | | | |
|---|---|---|---|---|
| 2,120,683 A | | 6/1938 | Simmons | |
| 2,484,239 A | | 10/1949 | Moon et al. | |
| 3,172,402 A | | 3/1965 | Valiela | |
| 3,209,743 A | | 10/1965 | Stewart et al. | |
| 5,154,159 A | * | 10/1992 | Knafelc | A47J 37/0704 126/25 B |
| 5,226,405 A | * | 7/1993 | Snow | A47J 37/079 126/25 B |
| 5,331,942 A | * | 7/1994 | McDonald | A47J 37/0694 126/25 B |
| 5,875,772 A | | 3/1999 | Saey | |
| 6,675,794 B1 | | 1/2004 | Yang | |

(Continued)

FOREIGN PATENT DOCUMENTS

| | | |
|---|---|---|
| DE | 10151402 | 6/2002 |
| EP | 1555920 | 7/2005 |

(Continued)

OTHER PUBLICATIONS

International Search Report for PCT Application No. PCT/IL2020/050992 mailed on Dec. 20, 2020.

*Primary Examiner* — Avinash A Savani

(57) ABSTRACT

A fuel grate for a grill is disclosed. The fuel grate may include: a solid fuel support grate, configured to fit into an internal cavity of the grill; and at least one fuel ignition surface, configured to be placed at a predetermined distance from the solid fuel support grate in the internal cavity of the grill, wherein the distance is determined as to allow placing combustible fire starter in an amount sufficient for igniting a solid fuel.

20 Claims, 5 Drawing Sheets

(56) References Cited

U.S. PATENT DOCUMENTS

| | | | | |
|---|---|---|---|---|
| 7,753,045 | B1 * | 7/2010 | Weese ................. | A47J 37/0786<br>126/25 B |
| 10,893,777 | B2 * | 1/2021 | Gross .................... | A47J 37/079 |
| 2007/0131216 | A1 * | 6/2007 | Le Breis ............... | A47J 37/079<br>126/25 R |
| 2009/0148801 | A1 * | 6/2009 | Wedermann ........ | A47J 37/0704<br>126/25 B |
| 2011/0271949 | A1 * | 11/2011 | Ortner ................. | A47J 37/0704<br>126/25 R |
| 2012/0090593 | A1 * | 4/2012 | Urquhart ............... | A47J 37/079<br>126/25 B |
| 2012/0234308 | A1 | 9/2012 | Faulk et al. | |
| 2018/0153346 | A1 | 6/2018 | Simms, II et al. | |

FOREIGN PATENT DOCUMENTS

| | | |
|---|---|---|
| EP | 2165631 | 3/2010 |
| FR | 2843868 | 3/2004 |

* cited by examiner

FUEL GRATE FOR A GRILL

CROSS-REFERENCE TO RELATED APPLICATIONS

This application is a U.S. National Phase Application of PCT International Patent Application No. PCT/IL2020/050992 International Filing Date Sep. 10, 2020, claiming the benefit of U.S. Provisional Patent Application No. 62/898,007, filed Sep. 10, 2019, which is hereby incorporated by reference.

FIELD OF THE INVENTION

The present invention relates to solid fuel grills. More particularly, the present invention relates to fuel grate for solid fuel grills.

BACKGROUND OF THE INVENTION

Grills, also known as, barbeques, are widely used domestic cooking appliances. The most commonly used grills are fed and powered by, solid fuels, such as charcoal, wood, briquettes, etc. There are several known methods of igniting solid fuel such as poring liquid fuel over the solid fuel, piling the solid fuel over kindling or combustible fire starters or using a "chimney" type fire starter. Each of these methods has its drawbacks.

For example, using liquid fuel may result in a residual bad taste within the foodstuffs and is considered relatively dangerous.

In another example, piling charcoal or briquettes over kindling or combustible fire starters requires a skilled operator, consumes time while pilling and patience, as igniting the fuel is most often slow, inefficient and at times unsuccessful, inefficiency having environmental impact and health issues due to soot and smoke as well as being non economically worthwhile.

In yet another example, using a "chimney" type fire starter may be advantageous regarding ignition time, however requires purchasing the "chimney" accessory separately from the grill. Additionally, "chimney" type fire starters are quite cumbersome to transport especially out doors and may be forgotten by users before or after use. Some users find difficulty in lifting a filled "chimney" due to its weight, more so, poring glowing coal embers on to a fuel grate, is considered a dangerous task for operator requiring protective wear as well as being dangerous for by standers due to air borne sparks, smoke and ash.

"Chimney" type fire starters are also inefficient regarding fuel consumption, and contributing to air pollution, wherein fuel inefficacy having an economic factor such as consuming more fuel then needed, i.e. fuel placed at bottom of "chimney" is consumed more than fuel at top, more so total fuel consumption needlessly increases, further contributing to environmental pollution.

In the field of barbequing, one of the most troublesome tasks in charcoal grilling is igniting the charcoal, briquettes or other solid fuel.

Many grill designs have openings at the perimeter used for air supply, some models having non-regulated openings known as vents, and other models having regulated openings known as dampers.

Other current grill designs having combined use of openings, wherein openings are used for cleaning or removing ash as well as for air supply. The air vents may be regulated or not and some grill designs have a combined damper and ash cleaner, such as, moving or rotating the ash cleaner also regulates air supply.

Other grill examples may also include a top cover grill, that may at least a vent or damper.

SUMMARY OF THE INVENTION

Some aspects of the invention may be directed to a fuel grate for a grill. The fuel grate may include: a solid fuel support grate, configured to fit into an internal cavity of the grill; and at least one fuel ignition surface, configured to be placed at a predetermined distance from the solid fuel support grate in the internal cavity of the grill, wherein the distance is determined as to allow placing combustible fire starter in an amount sufficient for igniting a solid fuel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 2:
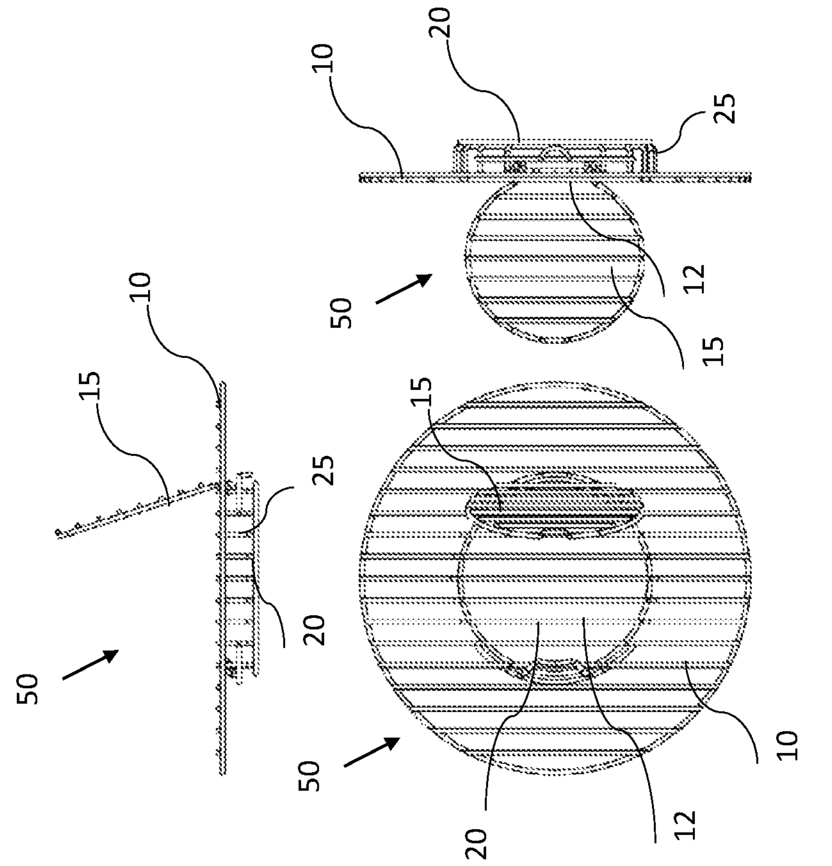
FIG. 2 shows an illustration of a fuel grate, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The disclosed embodiments reveal an intuitive easy to use method of igniting a solid fuel cooker or heater. The embodiments further disclose means of optimally igniting a solid fuel charcoal or briquette grill, kettle, smoker, stove or alike, safely and conveniently using a simple and straightforward step method. The invention yet further discloses a mixed fuel ignition system and in some embodiments controlling cooking temperatures.

In some aspect of the invention, a cooking or heating assembly, may include at least a solid fuel grate on which a user may simply pour solid fuel, such as, charcoal, briquettes or wood while combustible fire starters or kindling are shielded beneath the solid fuel grate at an optimal position and optimal air supply.

In a cooking or heating assembly according to some embodiments of the invention, the solid fuel ignition grate may hold or support at least some combustible fire starters or kindling at an optimal position and optimal air supply, shielded beneath solid fuel, therein enabling a safe and efficient ignition.

In some additional aspects, optimal ignition may be achieved by combining at least one of: a selected combustible fire starter (selected for example, to fit a specific type of grill, specific type of solid fuel, specific type of fuel grate, etc.), b) a specific type of solid fuel insert, and c) a fuel ignition system, In some embodiments, accessing shielded position for filling combustible fire starters into at least one fuel ignition surface is from a top position, when, the solid fuel grate is placed in an open cavity of the grill (e.g., the cooking or heating assemblies). In some embodiments, the fire starter may be inaccessible otherwise.

In some other aspect of the invention, a retrofit system may optimize the ignition performance between an existing solid fuel cooking or heating assembly, and the optimal solid fuel ignition grate or "optimal combustible fire starter" in combination.

There is thus provided in accordance with some embodiments of the present invention, a solid fuel grate and a method of igniting solid fuel included in a cooking or heating assembly. The assembly may include at least; a mostly enclosed perimeter casing and at least a top opening, a solid fuel grate and an ignition surface being placed within the assembly through a top opening, the ignition surface may be included in a top access shielded cavity in which combustible fire starters or kindling may be securely placed, thereafter, poring or piling solid fuel upon the fuel grate.

Figure 1:
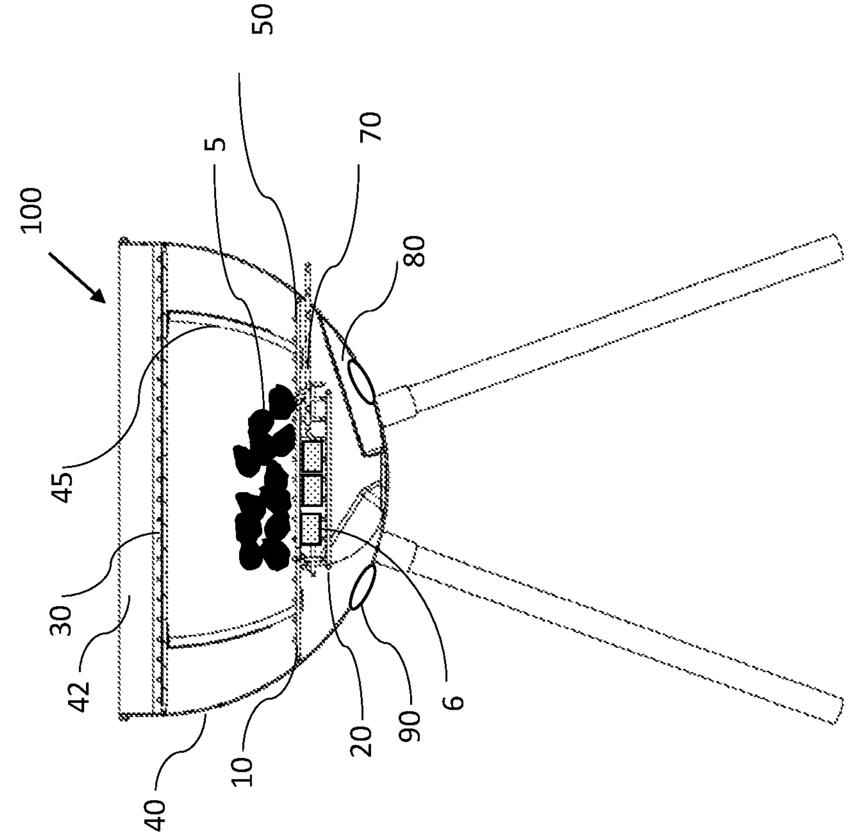
FIG. 1 shows an illustration of a grill that includes a fuel grate, according to some embodiments of the invention.

Reference is made to FIG. 1, which illustrates a grill with a fuel grate according to some embodiments of the invention. A grill 100 according to some embodiments of the invention may be any cooking appliance that utilizes solid fuel. For example, grill 100 may be a barbeque, grill, kettle, stove, a smoker, fireplace, fire pit and the like. Grill 100 may include a housing 40 having an internal cavity, at least one cooking grate 30 and a fuel grate 50.

In some embodiments, housing 100 may be accessible from one side, via a single opening, for example, from the top when grill 100 is placed in an operation position. Accordingly, inserting elements, components and/or materials into the internal cavity of grill 100 may be done only from this single opening. In some embodiments, housing 40 may have any geometric shape, for example, a hemisphere (as illustrated), an open box (illustrated in FIG. 9), an open prism and the like. One or more cooking grates 30 may be any cooking grate designed to geometrically fit into housing 40.

In some embodiments, grill 100 may further include supporting elements 45 for supporting cooking grate 30 and/or fuel grate 50. In some embodiments, grill 100 may further include an ash cleaning system 80 (e.g., rotating ash cleaner, an ash catcher, etc. not show, usually positioned beneath housing 40). In some embodiments, grill 100 may further include air ventilation system 90 for optimizing the air flow inside the internal cavity of housing 40. Ventilation system 90 may include at least one of, a fan, a damper and the like.

In some embodiments, fuel grate 50 may include a solid fuel support grate 10, configured to fit into an internal cavity of grill 100 and at least one fuel ignition surface 20, configured to be placed at a predetermined distance from solid fuel support grate 10 in the internal cavity of grill 100. In some embodiments, the distance may be determined as to allow placing combustible fire starter 6 in an amount sufficient for igniting solid fuel 5. In some embodiments, the area of at least one fuel ignition surface 20 may be at least 30% of the area of solid fuel support grate 10, in order to ensure an optimized ignition of solid fuel 5 by combustible fire starter 6 placed on surface 20. In some embodiments, fuel the area of the at least one fuel ignition surface is between 1%-50%. In some embodiments, fuel the area of the at least one fuel ignition surface is between 5%-95% of the area of the solid fuel support grate.

In some embodiments, fuel ignition surface 20 may be included in a cavity, nest, cage, etc., configured to hold and secure combustible fire starter 6. In some embodiments, fuel ignition surface 20 may be included in a package or block of combustible fire starter. Thus combustible fire starter 6 may also include surface 20.

In some embodiments, solid fuel 5 may include any solid fuel configured to provide heat to grill 100, for example, charcoal, briquettes, wood, a mixture of different fuels, etc. In some embodiments, combustible fire starter 6 may be any combustible fire starter known in the art having any geometrical shape, form, phase, etc. In some embodiments, combustible fire starter 6 may be a solid or liquid combustible fire starter. Accordingly, at least one fuel ignition surface 20 may be configured to hold solid combustible fire starter (as illustrated) or liquid combustible fire starter (e.g., by using a tray, as will be discussed herein below with respects to FIGS. 6 and 7). In some embodiments, solid fuel 5 and combustible fire starter 6 may be inserted into grill 100 only from opening 42 in housing 40. For example, combustible fire starter 6 may be placed on fuel ignition surface 20 via an opening in solid fuel support grate 10, as discussed herein below.

In some embodiments, fuel grate 50 may further include an ignitor 70 for igniting combustible fire starter 6. Ignitor 70 may be any device, known in the art, that may ignite combustible fire starter. In some embodiments, ignitor 70 may include at least one of: an electric arc, plasma, e-lighter and a gas source. Several examples for ignitor 70 are given herein below.

Some detailed nonlimiting examples for fuel grates according to embodiments of the invention are given in FIGS. 2-7.

Reference is now made to FIG. 2 which includes illustrations of top, side and front views of fuel grate 50 according to some embodiments of the invention. Fuel grate 50 may include solid fuel support grate 10 having an opening 12 for placing the combustible fire starter (e.g., combustible fire starter 6) on at least one fuel ignition surface 20. Opening 12 may be covered by a cover 15. Cover 15 may be pivotally connected to grate 20 via one or more hinges (as illustrated). Alternatively, cover 15 may be a separate element configured to be placed on top of opening 12, as illustrated for example, in FIG. 8. As would be appreciated by one skilled in the art opening 12 and cover 15 may have any size and shape and cover 15 may be connected to grate 10 using any known connectors or fasteners (e.g., hinges, clips, nuts, etc.).

Fuel grate 50 may include at least one fuel ignition surface 20, configured to be placed at a predetermined distance from solid fuel support grate 10 in the internal cavity of the grill (e.g., grill 100), such that the distance is determined as to allow placing combustible fire starter in an amount sufficient for igniting a solid fuel. In some embodiments, at least one fuel ignition surface 20 is made from one of: a solid plate, a grate (as illustrated), a perforated plate and the like. In some embodiments, at least one fuel ignition surface 20 may be connected to solid fuel support grate 10 by one or more connection elements 25. Elements 25 may be configured to connect at least one fuel ignition surface 20 to solid fuel support grate 10 to maintain the predetermined distance. In some embodiments, at least one fuel ignition surface 20 and connection elements 25 may form a compartment, nest, cage, etc. for holding/shielding combustible fire starter 6.

In some embodiments, connection elements 25 may be permanently connected (e.g., welded, screwed, etc. as illustrated) to at least one of fuel ignition surface 20 and solid fuel grate 10. Alternatively, connection elements 25 may be detachably connected to at least one of fuel ignition surface 20 and solid fuel grate 10, as to allow at least one of fuel ignition surface 20 and/or a cage including surface 20 to be attached and detached to solid fuel grate 10 (as illustrated and discussed with respect to FIG. 3B).

Figure 3B:
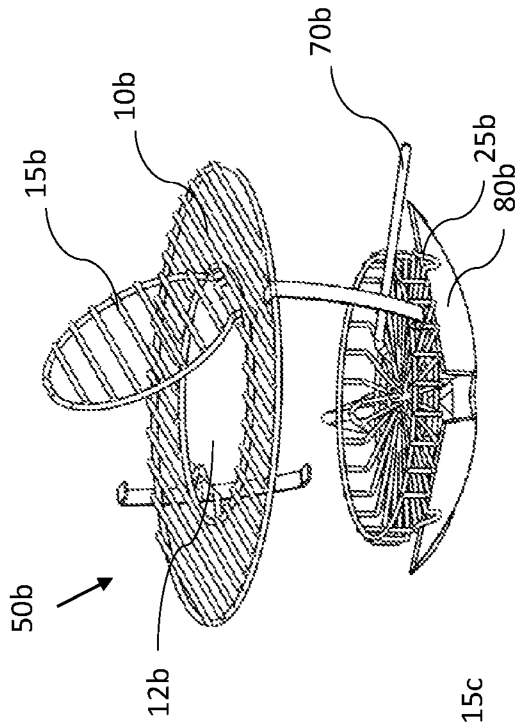
FIGS. 3A-3C show illustrations of fuel grates, according to some embodiments of the invention.
Figure 3C:
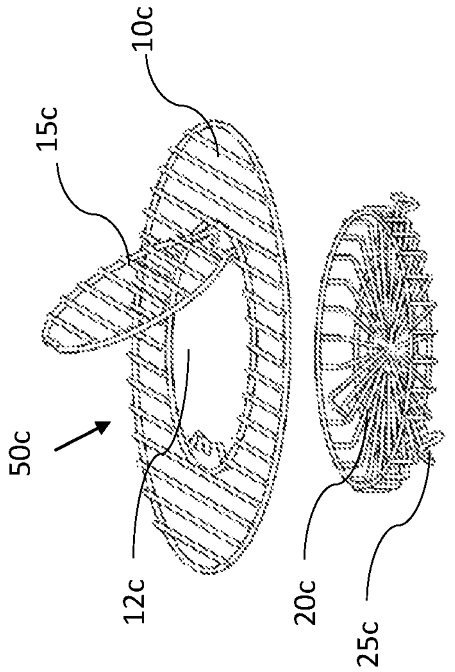
Figure 3A:
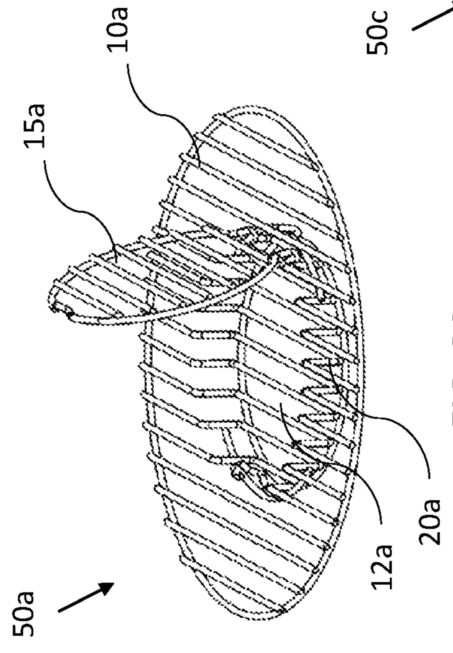

Reference is now made to FIGS. 3A-3C which are illustrations of various nonlimiting examples of fuel grates according to some embodiments of the invention. FIG. 3A shows a fuel grate 50*a* in which a fuel ignition surface 20*a* and a solid fuel grate 10*a* are permanently connected to form a single element. Fuel ignition surface 20*a* and solid fuel grate 10*a* may be permanently connected by welding or may be manufactured from a single grate using, for example, by any known metal forming process. In some embodiments, fuel grate 50*a* may further include a cover 15*a* for covering an opening 12*a* in solid fuel grate 10*a*.

FIG. 3B shows a fuel grate 50*b* which includes a fuel ignition surface 20*b* connected to to an ash cleaner 80*b* via connection elements 25*b* in order to ensure relatively large predetermined distance in comparison, for example, to fuel grates 50 and 50*a*. In some embodiments, fuel grate 50*b* may further include a cover 15*b* for covering an opening 12*b* in solid fuel grate 10*b*. In some embodiments, fuel grate 50*b* may further include an ignitor 70*b*, as discussed herein above. In some embodiments, fuel ignition surface 20*b* may be attached (either connected or not) to an ash cleaner 80*b*, which may be rotatable ash cleaner (as illustrated).

FIG. 3C shows a fuel grate 50*c* which includes a fuel ignition surface 20*c* which is not connected to solid fuel grate 10*c*. In some embodiments, fuel ignition surface 20*c* may include connectors 25*c* that are configured to be connected to fuel ignition surface 20*c* to other elements in the internal cavity of the grill (e.g., grill 100). For example, to protrusions in a housing, such as housing 40, to an ash cleaner, such as ash cleaner 80 and the like. In some embodiments, fuel grate 50*c* may further include a cover 15*c* for covering an opening 12*c* in solid fuel grate 10*c*. In some embodiments, fuel ignition surface 20*c* may be permanently connected to ash cleaner 80 to form a single combined element.

In some embodiments, covers 15*a*-15*c* may be lifted in order to allow the placing/inserting of combustible fire starter (e.g., fire starter 6) on top of the corresponding fuel ignition surfaces 20*a*-20*c*, via openings 12*a*-12*c*. It should be appreciated that fuel grate 50*c* may include more than one fuel ignition surface 20*c* and more than one corresponding openings covered by covers as described above. The number of fuel ignition surfaces and location or position thereof may be determined according to the area of the fuel grate, the air flow in the grill housing, locations of ventilation apertures in the housing, and the like.

Figure 4B:
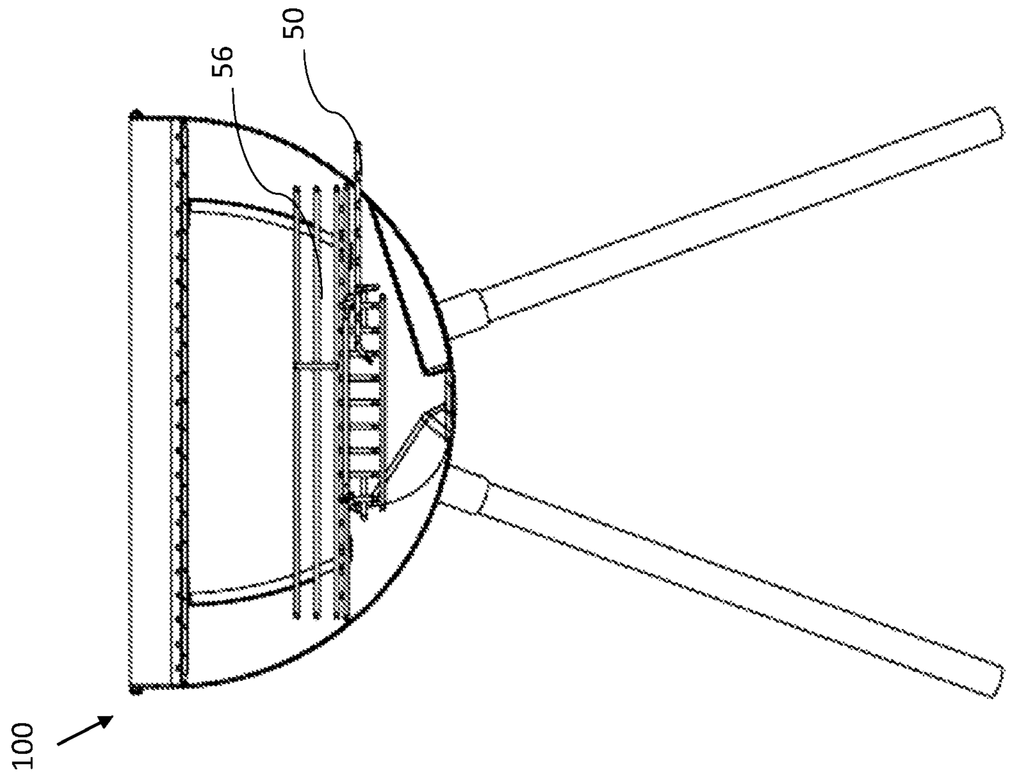
FIGS. 4A and 4B show illustrations of grills with fuel grates, according to some embodiments of the invention.
Figure 4A:
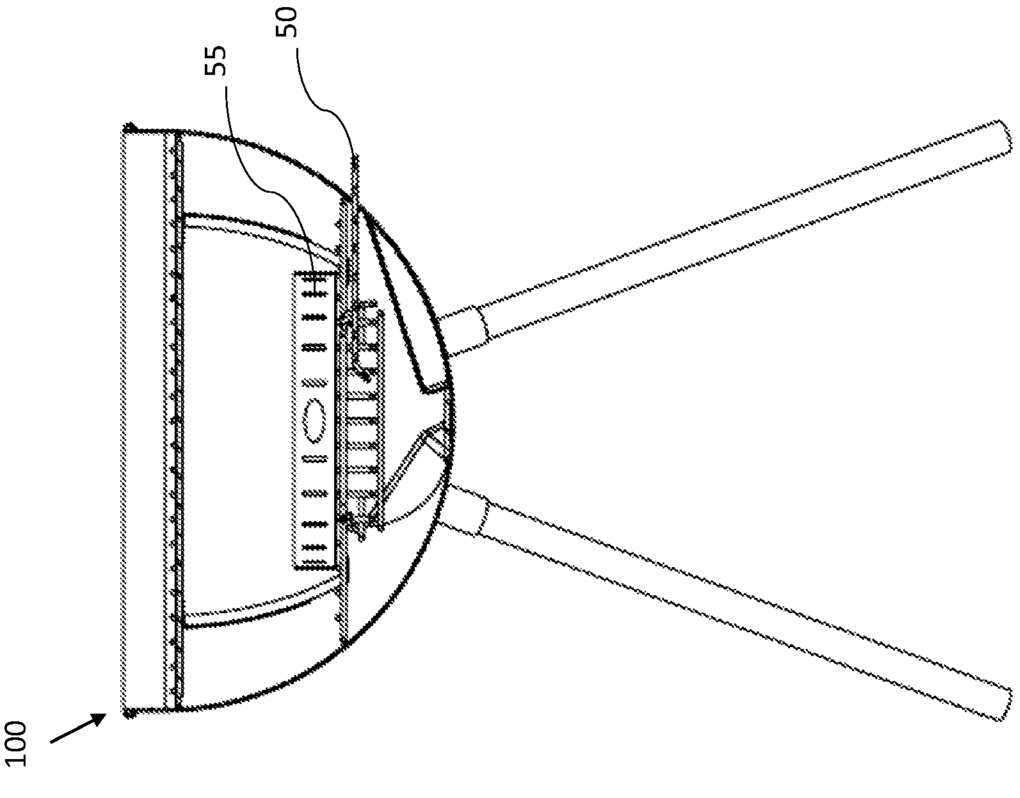

Reference is now made to FIGS. 4A and 4B which are illustrations of grills 100 having fuel grates 50 assembled inside the internal cavity of grill 100. Fuel grates 50 illustrated in FIGS. 4A and 4B may further include one or more separators or dividers assembled on solid fuel support grate 10, for defining a location at which the solid fuel (e.g., solid fuel 5) is to be placed during ignition phase. In some embodiments, the one or more separators may include a chimney 55, illustrated in FIG. 4A. In some embodiments, the one or more separators may include or create a cage 56, illustrated in FIG. 4B. In some embodiments, the one or more separators are selected from: cages, solid shields, perforated shields, chimneys, baskets, grates and any combination thereof.

In some embodiments, the at least one fuel ignition surface (e.g., surface 20) may include one or more separators assembled on the at least one fuel ignition surface, for defining at least two locations at which fire starters are to be placed. In some embodiments, placing fire starters at two or more different locations (e.g., according to a predefined distribution) may allow to cause better more efficient ignition of the sold fuel, by forming tow or more ignition locations in the fuel.

Figure 5:
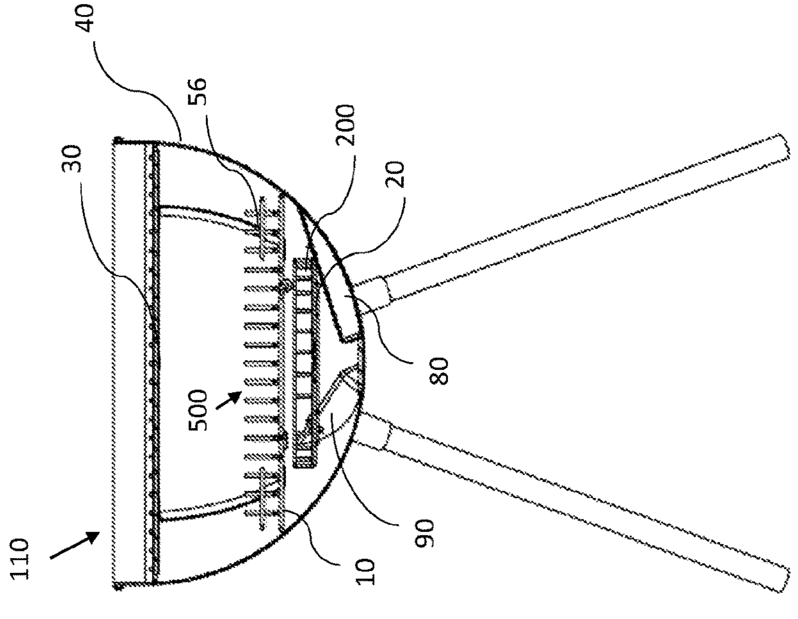
FIG. 5 shows an illustration of a grill that includes a fuel grate, according to some embodiments of the invention.

Reference is now made to FIG. 5 which is an illustration of a grill 110 having a fuel grate 500 assembled inside the internal cavity of grill 110. Grill 110 may have substantially the same structure, elements and components as grill 100 discussed hereinabove. Fuel grate 500 may include a solid fuel support grate 10 having a cage 56 (as discussed hereinabove), configured to fit into an internal cavity of grill 110 and an ignition unit 200 that may include at least one fuel ignition surface 20, configured to be placed at a predetermined distance from solid fuel support grate 10 in the internal cavity of grill 110, such that the distance is determined as to allow placing combustible fire starter in an amount sufficient for igniting a solid fuel. In some embodiments, ignition unit 200 may be separated from (as illustrated) or detachably connected to solid fuel support grate 10. Ignition unit 200 may have a shape of a compartment, cage, nest and the like and may be made from wires, plates, perforated plates etc.

In some embodiments, ignition unit 200 may be detachably connected (e.g., via connectors) to other parts in grill 110, for example, to housing 40 or to protrusions in housing 40 (not illustrated), to ash cleaner 80 (as illustrated) or elsewhere. In some embodiments, ignition unit 200 may have a form of a cage (as illustrated) designed to hold the combustible fire starter in an amount sufficient for igniting a solid fuel. In a nonlimiting example, ignition unit 200 may be permanently connected to ash cleaner 80 (e.g., welded, via special connectors, etc.).

Figure 6:
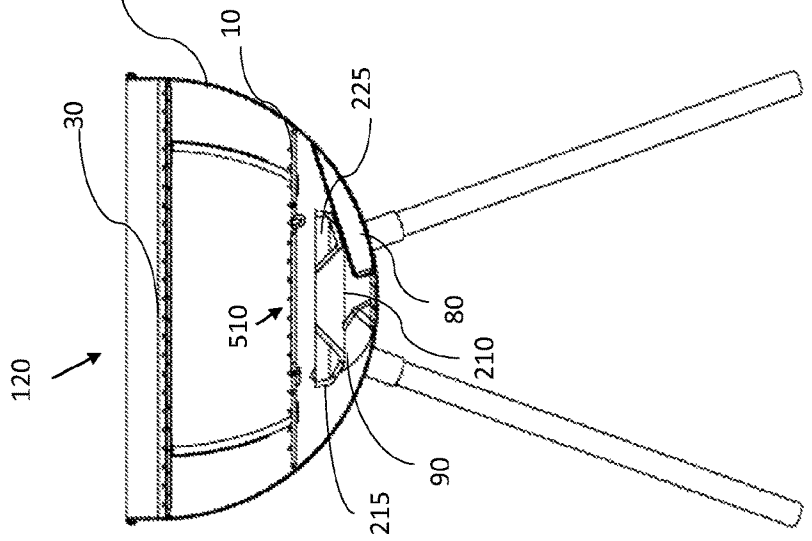
FIG. 6 shows an illustration of a grill that includes a fuel grate, according to some embodiments of the invention.

Reference is now made to FIG. 6 which is an illustration of a grill 120 having a fuel grate 510 assembled inside the internal cavity of the grill. Grill 120 may have substantially the same structure, elements and components as grill 100 discussed herein above. Fuel grate 510 may include a solid fuel support grate 10, configured to fit into an internal cavity of grill 120 and an ignition unit 210 that may include at least one non-flat fuel ignition surface 215 (e.g., a concaved tray)

configured to hold liquid fire starter. Alternatively, ignition unit 210 may include specially designed fire starter 225 to be placed on top of fuel ignition surface 215. In some embodiments, fuel ignition surface 215 may be included in specially designed fire starter 225, for example, forming one surface of fire starter 225, embedded in a package wrapping fire starter 225, included in the combustible material of fire starter 225, and the like. Fuel ignition surface 215, may be solid, perforated, may include a grate, etc. and may be configured to be placed at a predetermined distance from solid fuel support grate 10 in the internal cavity of the grill, such that the distance is determined as to allow placing combustible fire starter in an amount sufficient for igniting a solid fuel. In some embodiments, ignition unit 210 may be separated from solid fuel support grate 10. Fuel ignition surface 215 may be a non-flat surface (e.g., a cylindrical) included/embedded in specially designed combustible fire starter 225. Specially designed fire starter 225, may be connected to grate 10, for example, by wires or connectors, or may be connected elsewhere in grill 120.

In some embodiments, ignition unit 210 may be detachably connected to other parts in grill 120, for example, to housing 40 or to protrusions in housing 40 (not illustrated), to ash cleaner 80 (as illustrated) or elsewhere. In a nonlimiting example, ignition unit 210 may be permanently connected to ash cleaner 80 (e.g., welded, via special connectors, etc.). In some embodiments, ignition unit 210 may have a form of a tray (as illustrated) designed to hold liquid or specially designed combustible fire starter 225 in an amount sufficient for igniting a solid fuel.

Figure 7:
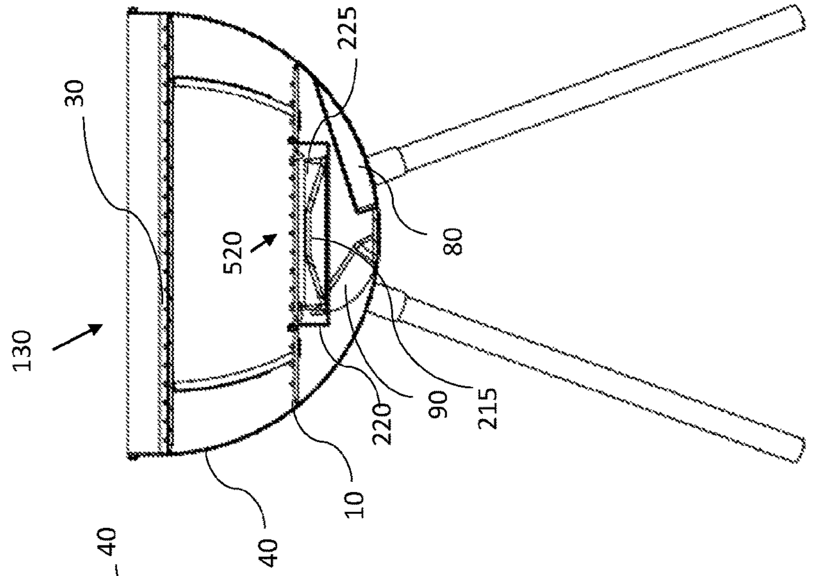
FIG. 7 shows an illustration of a grill that includes a fuel grate, according to some embodiments of the invention.

Reference is now made to FIG. 7 which is an illustration of a grill 130 having a fuel grate 520 assembled inside the internal cavity of the grill. Grill 130 may have substantially the same structure, elements and components as grill 100 discussed herein above. Fuel grate 520 may include a solid fuel support grate 10, configured to fit into an internal cavity of grill 130 and an ignition unit 220 that may include at least one non-flat fuel ignition surface 215 (e.g., a tray) configured to hold liquid fire starter or included in a non-flat (e.g., a cylindrical) specially designed combustible fire starter 225. Alternatively, ignition unit 220 may include specially designed fire starter 225 (an "optimal combustible fire starter") to be placed on top of fuel ignition surface 215. Fuel ignition surface 215 may be configured to be placed at a predetermined distance from solid fuel support grate 10 in the internal cavity of the grill, such that the distance is determined as to allow placing combustible fire starter in an amount sufficient for igniting a solid fuel. In some embodiments, ignition unit 210 may be connected to solid fuel support grate 10.

In some embodiments, ignition unit 210 may have a form of a tray (as illustrated) designed to hold liquid or specially designed combustible fire starter 225 (an "optimal combustible fire starter") in an amount sufficient for igniting a solid fuel.

In some embodiments, any one of grates 500, 510 and 520 may include a cover for covering an opening in solid fuel grate 10, for introducing corresponding ignition units 200, 210 and 220 into grills 110, 120 and 130.

Figure 8:
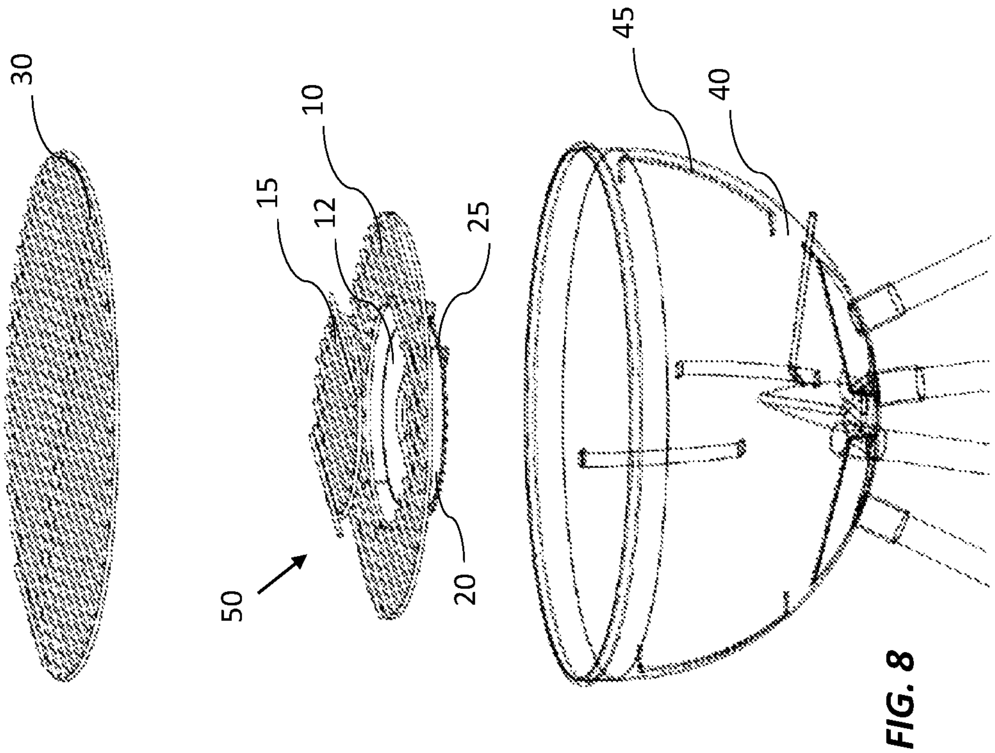
FIG. 8 shows a process of assembling a rounded fuel grate, according to some embodiments of the invention inside a grill.

Reference is now made to FIG. 8 which illustrates a process of assembling a fuel grate according to some embodiments of the invention. Fuel grate 50, (or grate 50*a*-50*c* and 500-520) may be assembled in an existing grill, replacing an original solid fuel grate received with the grill or may be originally assembled in the grill in the grill's manufacturer's premises. In order to assemble grate 50 into a grill (e.g., grills 100-130) cooking grate 30 may be removed via the opening (e.g., opening 42) in the grill and grate 50 may be placed inside, for example, supported by support elements 45. In order to cook or grill food on cooking grate 50, cover 15 may be opened or removed from grate 10 and combustible fire starter may be placed on fuel ignition surface 20 (e.g., in a compartment) to be covered by cover 15. In some embodiments solid fuel may be placed on top of grate 10 and cover 15. The combustible fire starter may be ignited prior to placing the solid fuel or after placing the solid fuel, for example, using an ignitor such as ignitor 70. In some embodiments, ignitor 70 may be permanently or detachably connected to grill 100.

Figure 9:
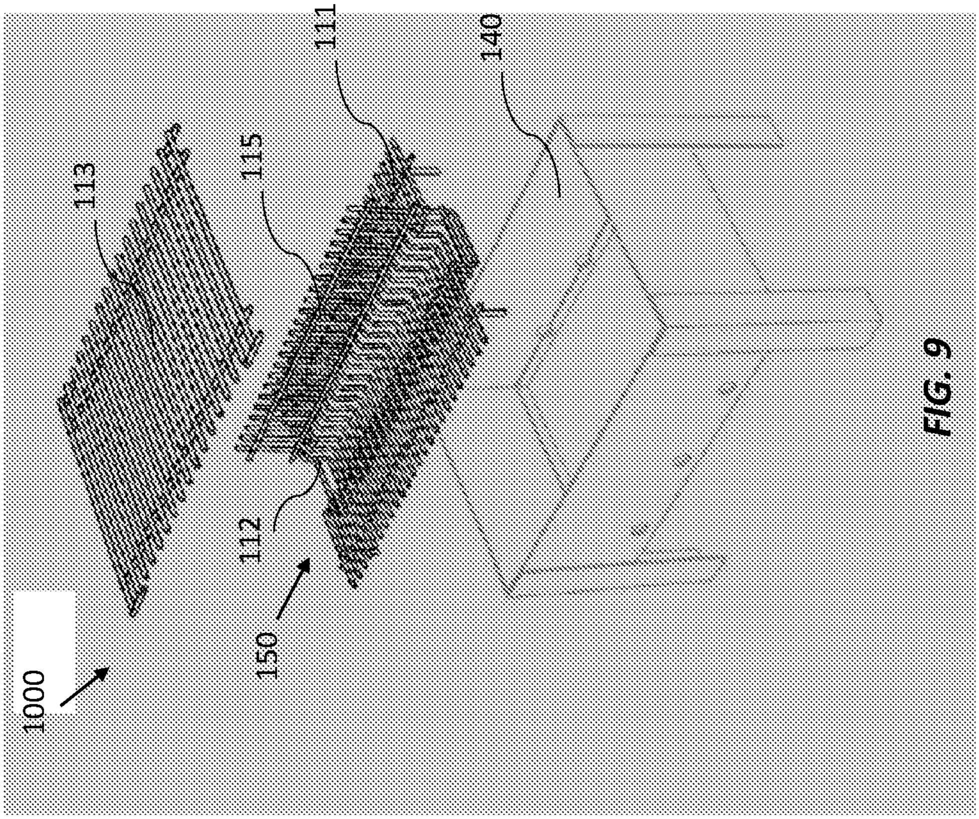
FIG. 9 shows a process of assembling a rectangular fuel grate, according to some embodiments of the invention inside a grill.

Reference is now made to FIG. 9 which illustrates a process of assembling a rectangular fuel grate according to some embodiments of the invention. Rectangular fuel grate 150 may be assembled in an existing grill, replacing an original solid fuel grate received with the grill or may be originally assembled in the grill in the grill's manufacturer's premises. In order to assemble grate 150 into a grill 1000, cooking grate 113 may be removed and grate 150 may be placed within grill's 1000 internal cavity and cooking grate 113 may then be repositioned above (when in operation position) grate 150. In order to cook or grill food on cooking grate 130, cover 115 may be lifted to disclose an opening 112 in a fuel support grate 111, and combustible fire starter may be placed on fuel ignition surface 112 to be covered by cover 115. In some embodiments solid fuel may be placed on top of housing 40 or to grate 111 and cover 115. The combustible fire starter may be ignited prior to placing the solid fuel or after placing the solid fuel, for example, using an ignitor such as ignitor 70 or a hand held ignitor.

Some aspects of the invention may include a kit comprising a solid fuel grate (e.g., grates 50, 50*a*-50*c*, 500-520 and 150) and a combustible fire starter (e.g., especially designed combustible fire starter 225). In some embodiments, combustible fire starter 225 may be adopted to fit onto at least one fuel ignition surface 20 (e.g., into a compartment, cage, nest, tray and the like) or into ignition unit according to some embodiments of the invention.

In accordance with some embodiments of the present invention, a solid fuel ignition grate and method of igniting solid fuel may include at least; a solid fuel grate (e.g., grate 50, 50*a*-50*c*, 500-520 and 150), the grate comprising at least a top access shielded compartment. As used herein a "shielded compartment" may include at least one fuel ignition surfaces 20, 20*a*-20*c* and 112. In some embodiments, upon accessing the compartment from above the user may place kindling or combustible fire starters at shielded position, thereafter, piling or poring solid fuel such as charcoal, briquettes, wood etc. upon the ignition grate, allowing a safe convenient and efficient ignition.

In some embodiments, a charcoal grill or kettle assembly, combining at least a top access solid fuel ignition grate (e.g., grate 50, 50*a*-50*c*, 500-520 and 150) having at least a top access shielded compartment is provided. In some embodiments the kettle or grill assembly may include at least an air vent (e.g., air ventilation system 90) allowing optimal air supply for ignition of the solid fuel. The term "optimal air supply" as used herein may refer to an air supply that provides full ignition of the solid fuel whilst using a minimal amount of fuel. For example, igniting all charcoal placed on the solid fuel support grate while using less than 10 percent of the charcoal. In some embodiments, the kettle or grill assembly may further include at least one of: cooking grate (e.g., cooking grate 30) dispersed above fuel grate or at least one of: lid covering kettle or grill, alternatively in combination, the kettle or grill assembly combining an ash cleaner or ash catcher. As used herein "the kettle or grill assembly" may be grills 100, 110, 120 and 1000 discussed herein above.

A grill (e.g., grills 100, 110, 120 and 1000) according to some embodiments of the invention may further include at least an air vent allowing optimal air supply for ignition, and thereafter controlling air supply by (e.g., by partially or fully closing) a damper for controlling cooking temperature by controlling air supply to the charcoal or solid fuel. In some embodiments, the grill may further include at least one of: a) cooking grate dispersed above fuel grate, b) lid covering kettle or grill, c) ash cleaner, d) ash catcher, e) thermometer (e.g., integrated perimeter thermometer), f) supporting legs (e.g., foldable supporting legs), g) handle, h) hanger, i) a foldable table, j) a side table, k) wheels, l) charcoal bin, m) rotisserie and any combination thereof. In some embodiments, the air damper is integrated with an ash cleaner or rotating ash cleaner.

The kettle or grill assembly may in some embodiments include any one of: a) hinged lid, b) non hinged lid and c) lid hanger. In some embodiments, the lid may include at least one of; a) integrated lid thermometer, b) an air damper, c) and a handle.

A cooking or heating assembly according to some embodiments of the invention may be included in a retrofit system. In some embodiments, the retrofit may include optimizing ignition performance (e.g., by optimizing air supply) at least between an existing kettle or grill air supply and at least one of; a) ignition grate openings/spaces/holes or spacing's, b) compartment openings or spacing's, c) shield openings or spacing's, d) a selected combustible fire starter 225, e) combustible fire starters position, and any combination thereof. In some alternative embodiments, the retrofit optimization assembly may include at least a rotatable ash cleaner and the compartment or combustible fire starter holder dispersed beneath the ignition grate, the compartment and holder comprising at least one of; a) nested or supported upon assembly perimeter or bottom, b) nested, supported or detachably connected with rotatable ash cleaner, c) integrated joined with rotatable ash cleaner.

In some embodiments cooking or heating assemblies may be included in retrofitted optimized system. Such a system may allow optimizing ignition performance using assemblies having at least no vents. In some embodiments the top access shield is detachably connected to solid fuel ignition grate (e.g., grates 10, 111). In some embodiments the top access compartment is detachably connected to solid fuel ignition grate. In some embodiments the top access compartment and shield are detachably connected to solid fuel ignition grate. In some embodiments the solid fuel ignition grate may be at least one of: mechanically aligned within a cooking or heating assembly. In some embodiments the solid fuel ignition grate may at least be aligned within an optimal air supply.

In some embodiments the solid fuel ignition grate (e.g., grates 10, 111) may include predetermined (e.g., optimal) spacing, distance or openings for optimally holding at least a specific type of solid fuel (e.g., fuel 5) and at least a specific size or size range of solid fuel. It should be appreciated that the terms optimal distance or spacing as well as optimally holding, as used herein may refer to a ratio between the size of solid fuel elements and gaps or openings in the fuel grate that would prevent falling of fuel elements through such gaps on the one hand, and would allow maximal air flow therethrough on the other hand. In some embodiments, the optimal spacing and optimal openings may further include optimizing air supply to the solid fuel and allow optimal ignition, the ignition grate in some embodiments may be optimized for at least; charcoal, briquettes, wood, fire logs, "solid fuel insert", or a combination thereof.

In some embodiments the solid fuel ignition grate may include optimal spacing or openings for optimally holding at least varying types of solid fuel and at least varying sizes or range of sizes of solid fuel. The optimal spacing and optimal openings may further include optimizing air supply to the solid fuel and allow optimal ignition, the ignition grate in some embodiments may be optimized for at least; charcoal, briquettes, wood, fire logs, "solid fuel insert", or any combination thereof.

In some embodiments, the top access shield (e.g., covers 15, 15*a*-15*c* and 115) may include optimal spacing or openings for optimally holding at least varying types of solid fuel and at least varying sizes or range of sizes of solid fuel. The optimal spacing and optimal openings may further include optimizing air supply to the solid fuel and allow optimum ignition, the ignition grate in some embodiments may be optimized for at least; charcoal, briquettes, wood, fire logs, "solid fuel insert", or any combination thereof.

In some embodiments, the top access compartment (e.g., at least one fuel ignition surface 20 and/or ignition units 200-220) may include optimal spacing or openings for optimally holding at least a specific type of combustible fire starter (e.g., combustible fire starter 225) and at least a specific size or size range of fire starter. The optimal spacing and optimal openings may further include optimizing air supply to the fire starter to allow optimal ignition. The compartment in some embodiments may be optimized for at least; solid fuel, gel, powder, pellets, paper, charcoal, wood, pellets, "optimized combustible fire starter" (e.g., fires starter 225), "optimized combustible fire starters", kindling or in combination, the fire starters may comprise varying geometric shapes or resembling at least some shape as a; disk, cubes, pills, briquettes, sphere, half sphere, cone, rectangle, triangle, cylinder etc.

In some embodiments, the solid fuel grate may be adopted to accommodate any type of fire starter at any form, for example, gel, powder, pellets, paper, charcoal, wood, pellets, "specially designed combustible fire starter" (e.g., fires starter 225), kindling or any combination thereof. The fire starters may have any geometric shape such as, for example: disks, cubes, pills, briquettes, spheres, hemispheres, cones, rectangle, triangle, cylinder etc.

In some embodiments, adjusting the spacing and openings in the shielded compartment may control the amount of air provided to the fire starter, thus affecting the ignition efficiency (e.g., how much of the provided fuel was ignited after a predetermined time).

In some embodiments, the solid fuel grate (e.g., grates 50, 50*a*-50*c* and 150) may include at least a top access shielded compartment. in some embodiments, accessing the compartment by moving the shield (e.g., covers 15, 15*a*-15*c* and 115). In some embodiments the shield may be at least one of; hinged, slidable, rotatable horizontally, rotatable vertically. Alternatively, the shield may include at least one additional functionality, such as, diffuser, damper, charcoal holder, divider, liquid reservoir or in combination. In one non limiting example, the movable shield may include a metal wire. The metal wire may be flexible, deformable. bendable upon inserting combustible fire starter or kindling into the compartment. Alternatively, the metal wire may be hinged or guided.

In some embodiments, the solid fuel grate may include a plurality of top access shielded cavities. The cavities (which may be identical or not) may optimally be positioned within the grill internal compartment.

In some embodiments, the multiple cavities may be dedicated for a particular use, for example, some shielded cavities may be used for igniting fuel at least within a charcoal basket or holder may be located at a specific location. In some embodiments, the charcoal basket may include; an open bottom and nesting.

In some embodiments, the top access compartment may include a liquid reservoir.

In some embodiments, the top access cavity may be divided or sectioned, (e.g., permanently or detachably applied) into sections, allowing the use of different types and/or amounts of fire starters or different sections of the fuel grate.

In some embodiments, the cooking or heating assembly (e.g., grill 100, 110, 120, 130 and 1000) may include, a multi-function rotatable ash cleaner, combustible fire starter compartment holder, and air supply damper. In some embodiments, multi-function ash cleaner-holder-damper, may be manufactured at least from one part or at least from more than one part, thereafter assembled. In some embodiments, the assembly may include pre-assembling the multi-function cleaner-holder-damper, within the cooking or heating assembly, or individually assembling each part within the cooking or heating assembly.

In some embodiments, the top access shielded compartment may be at least one of: a) deformable, b) contractible, c) foldable, d) compactable, e) compressible and f) shrinkable. In some embodiments, the compartment may have flattened state or decreased dimensions, for example, reducing height or depth. In some embodiments, the top access shielded cavity may include at least one of: a) deformable net, b) wire mesh, c) wire hung, d) chain hung, e) telescopic, f) hinged, and g) sprung.

In some embodiments, the shielded compartment may include at least a housing frame, that may be made from metal wire or cast. In some embodiments, the housing frame may include a solid fuel holder and/or a paper fire starter holder.

In some embodiments, the at least a top access shielded compartment may have at least one of: a) interchangeable solid combustible fire starters and kindling holder, b) interchangeable gel fire starter holder, c) interchangeable powder fire starter holder, d) interchangeable pellet fire starter holder and e) interchangeable paper fire starter holder.

In some embodiments, the at least a top access shielded compartment may be included in ignition grate which may be some defused or not and cavity may be some defused or not.

In some embodiments, a fire starter (e.g., a selected or "optimal combustible fire starter 225") may include a shield or a disposable shield, a housing, disposable housing. In some embodiments, the shield or fire starter edge may nest upon the grate and fire starter may be secured beneath, alternatively, the housing may be nesting beneath the fuel grate.

In some embodiments herein the solid fuel ignition grate may be part of a cooking or heating system wherein the top access compartment comprising at least being some extension of the ignition grate and the top access shield comprising at least being hinged to ignition grate.

In some embodiments, each the top access compartment t being an extension of the fuel grate and the top access shield may be divided into, for example, separately hinged shields that may allow accessing the compartment from different directions.

In some embodiments, the separately hinged shields may each allow accessing the compartment or cavities when raising a charcoal holder. In such case the raised shields may be locked, secured, latched or otherwise temporary applied in position thereafter being raised. In some embodiment, the shield may be at least one of: a) concave, b) convex, c) flat, d) raised above grate surface, e) in line with grate surface and f) depressed beneath grate surface.

In some embodiments, the solid fuel may include at least one of: a) spacer, b) supporting vertical wall, and c) supporting vertical grate. In some embodiments, the spacer or support, the vertical wall or grate may extend upwards, resembling a basket for supporting solid fuel.

In some embodiments, the shielded compartment may include at least one of: protrusions and depressions, that may.

In some embodiments, the shielded compartment may include, a flat region, maneuverable flat region, non-flat region, maneuverable non-flat region optimized for supplying air and facilitating ignition. In some embodiments, the maneuverable region may allow manipulating charcoal or briquettes from an ignition position to a cooking position.

In some embodiments, the solid fuel ignition grate may be included in a kit that may further include the combustible fire starter. The combustible fire starter may include a shield, a coating or a cover and may be placed in the compartment. In some embodiments, the shield/coating/cover may be disposable or reusable.

some embodiments, the solid fuel grate may be horizontally slidable upon a rail, slide or guide. In some embodiments, the grill may have at least an opening at the perimeter or beneath the grill, enabling accessing the shielded compartment from above after sliding the grate horizontally. In some embodiments, the kettle or grill assembly may have at least one: a cooking grate dispersed above ignition grate, a vent or damper opening, and a lid.

In some embodiments, the grate is hinged to the grill such that upon lifting the grate reveals the shielded compartment. The compartment may be hinged or otherwise permanently secured or applied to the grate. When hinged, the compartment may be weight balanced and revealed simultaneously when lifting the grate, thereafter lifting the top accesses ignition grate, the grate may be hung or otherwise secured to the kettle or grill assembly.

In some embodiment, the top accesses ignition grate may be lifted, such that upon lifting the ignition grate reveals the shielded compartment. In some embodiments, the compartment may be nested, secured or otherwise applied within the grill or kettle assembly, thereafter lifting the top accesses ignition grate, the grate may be hung upon or secured to the kettle grill assembly.

Alternatively, the compartment may be part of the ash cleaning system or nest upon the cleaning system, rotating or otherwise moving simultaneously.

In some embodiments, the grate may be lifted to a suitable angel as to hold its position. The hinge may comprise at least some slack or movement in the horizontal or all most horizontal direction, such that the horizontal movement of the hinge and grate allowing additional travel wherein grate may be limited such as with kettle grills.

In some embodiment, the top accesses ignition grate comprising at least a rim and may resemble a basket, which may be lifted, such that upon lifting the ignition grate basket reveals the shielded compartment. In some embodiments, the ignition grate basket may be at least partially disposable and at least partially reusable. Some embodiments, may include covering all or some of the cooking area. In some embodiments, the ignition grate basket may be disposable and may include some charcoal, briquettes or wood secured within at least a metal wire net or at least some metal sheet, and be part of an ignition kit or system.

In some embodiments, the solid fuel grate may be manufactured from a non-ignitable material such as metal, for example, in the form of; wire, wire mesh, wire net, metal sheet, perforated metal sheet, drawn sheet, spun grate, machined grate, welded net, casted grate, or a combination thereof. In some embodiments, the metal may include, cast iron, steel, stainless steel, aluminum alloy. The metal may be coated using any know coating (e.g., for increasing corrosion resistance, abrasion resistance and the like). In some embodiments, portions of the fuel grate may include ceramics.

In some embodiments, the solid fuel grate may include a non-movable shield and accessing the compartment may be at an angel relative the top. Due to the access angel to the compartment opening, charcoal or briquettes may not enter freely when poured upon the grate, however inserting a combustible fire starter is possible. In some embodiments, the shape and size of the angled opening is adapted to that of the combustible fire starter, alternatively, the ignition grate may include multiple top access shielded cavities, such that accessing the compartment may be at an angel.

In some embodiments, the combustible fire starter may include segments/parts being at least an order of magnitude smaller in at least one dimension than segments/parts of the solid fuel. Accordingly, the nest or cage elements of the compartment may be spaced a part such that the combustible fire starter may enter the shielded compartment while solid fuel cannot. For example, the ignition grate may be made from metal wire, and the spacing between the wires may be optimized so charcoal or briquettes do not enter freely when poured upon the grate, however inserting "optimal combustible fire starters" is possible, the compartment comprising optimized spacing or openings for "optimal combustible fire starters", the compartment may be permanently applied to ignition grate or detachably applied.

In some embodiments, the at least shield (e.g., covers 15, 15*a*-15*c* and 115) may at least some spacing or opening; a) same as ignition grate, b) more than ignition grate and c) less than ignition grate.

In some embodiments, the compartment may include at least some spacing or opening; a) same as ignition grate, b) more than ignition grate and c) less than ignition grate.

In some embodiments, the size/dimensions of spacing or opening of the compartment and/or the shield may be determined as to optimized the air flow to the fire starter.

In some embodiments, the compartment, and/or the shield (e.g., cover) may be disposable, semi disposable or reusable. In some embodiments, the compartment and/or the shield may include combustible fire starters or kindling, for example, to form a kit.

In some embodiments, optimal air supply may include at least one of: a) optimal geometry air supply vents or openings and b) optimal size air supply vents or openings.

In some embodiments, the "optimal combustible fire starter" or "optimal combustible fire starters" mat include at least one of: a) optimal geometry, b) optimal size and c) optimal composition. In some embodiments, the "optimal combustible fire starter" may be optimized according to: the type of fuel, the amount of fuel, the varying types of fuel, the amount of fuel range, the sizes of solid fuel, and the range of sizes of solid fuel.

In some embodiments, the combustible fire starter may include openings and ducts or passages for air circulation and/or at least some integrated diffusers.

In some embodiments, air supply vents or dampers may be positioned optimally above or beneath kindling or combustible fire starters. The air supply vents may alternatively be positioned adjacent or in close proximity to kindling or combustible fire starters. In some embodiments, the optimally supplied air may reach kindling or combustible fire starters from a distant location aided by at least one of: path, duct, tubing, conduit or alike and may include dampers or not. The distant location may be at grill or kettle bowel perimeter or beyond grill or kettle perimeter.

In some embodiments, air supply may be prohibited or restricted from reaching the fuel/fire starter by at least a damper. In some embodiments, the air may be obtained from combustible fire starter or kindling surroundings as well as from above the ignition grate.

In some embodiments, the kettle or grill assembly may not include vents or dampers, and the air supply may be obtained from combustible fire starter or kindling surroundings as well as from above the ignition grate.

In some embodiments, igniting the combustible fire starter may be carried out using air vents or dampers that may be automatically or manually controlled, for example, based on temperature reading from a thermometer or according to a predetermined time dependent plan.

Some embodiments of the invention may discloses include a method of operating a grill, for example, a grill having a fuel grate according to any embodiment of the invention. The method may include poring charcoal or briquettes freely on to the grill, eliminating the need of specifically piling the charcoal or briquettes and avoiding the dangers of poring glowing hot ambers, ash and spark fall out, associated with "chimney" (e.g., chimney 55) fire starters, allowing a simplified and safe ignition process.

In some embodiments, ignition may be enhanced by at least an electric fan or blower, the fan may be supplied by grid power, replaceable or rechargeable batteries, alternatively combining at least a solar cell. In some embodiments, the fan may be manually operated and possibly supply axillary power as well, powering such devises as cell phones, lighting, charging batteries, audio speakers, cooling, heating etc.

In some embodiments, the solid fuel grate may be include a thermoelectric module, for converting heat energy and delivering electricity. For example, the electricity may be used for igniting at least a combustible fire starter or at least an "optimal combustible fire starter".

In some embodiments, the ignition grate may include an "ignition chimney" (e.g., chimney 55), the "ignition chimney" having no bottom and a generally described a hallow profile. Alternatively, a divider, wall or holder may be placed upon the ignition grate to fence or sustain some solid fuel. In some embodiments the "ignition chimney" or divider may be lifted up wards or sidewise, thereafter solid fuel may sufficiently be ignited, dispensing the ignited embers charcoal upon the grate effortless and safely.

In some embodiments, the "ignition chimney" (e.g., chimney 55) or divider (e.g., cage 56) may be double walled constructed, such that the double walled construction may be used at least for optimizing air circulation or at least for retaining water or other liquid needed for a particular cooking or heating need.

Lifting the "ignition chimney" (e.g., chimney 55) may be carried out using common tools found at outdoor cooking's, such as tongs or alike or using a designated tool, the "ignition chimney" may alternatively in some embodiments, comprise at least an opening about periphery or at least a protrusion used for lifting.

In some embodiments, the "ignition chimney" (e.g., chimney 55) may include air vent openings and in some embodiments may include at least inward protrusions.

In some non-limiting example, the "ignition chimney" may be connected or aligned with openings within the ignition grate or alternatively, be connected or aligned with projections upon the ignition grate.

In some embodiment, the ignition grate may be manufactured from at least some metal wire wherein the "ignition chimney", having a solid fuel sustaining element that may be wedged between said metal wires, alternatively, the "ignition chimney" may be otherwise centered, aligned or positioned upon the grate.

In some embodiment, the ignition grate may include at least some positioning protrusions, for guiding or aligning at least one of; "ignition chimney" (e.g., chimney 55), charcoal basket (e.g., cage 56), "solid fuel insert" or a combination thereof.

In some non-limiting example, the "ignition chimney", solid fuel sustaining element, in some embodiments hereof comprising being manufactured of at least paper and paperboard alternatively in combination with wax, oil or paraffin, In yet other non-limiting example, the "ignition chimney", solid fuel sustaining element, in some embodiments hereof comprising at least one of compressed wood particles, mixtures or compounds of fuel binders such as paraffin, wax, oil etc. and wood fiber, alternatively natural fiber and fuel binders such as paraffin, wax, oil etc. may be used, or combinations of charcoal or compressed charcoal and binder such as starch for example.

Other variations of manufacturing may include methods and materials known for manufacturing charcoal briquettes, for example, The "ignition chimney", solid fuel sustaining element, may be manufactured from coal or coal particles and some binders compressed, in some non-limiting example, materials from which coal may be manufactured include but not limited, cocoanut shells and husk, oak, pine.

Benefits of the bottomless "ignition chimney" may have relatively greater capacity per given height compared to ordinary chimney, wherein bottomless "ignition chimney" having no internal grate, reversely explained, compared by volume, the "ignition chimney" will be shorter given the same geometry and perimeter, allowing greater stability and ease of release.

In yet another embodiment the "ignition chimney" may be foldable.

In yet another embodiment the "ignition chimney" may include at least two parts, wherein first part fitting in to second part for transporting, each part comprising at least a different volume capacity for holding solid fuel, the embodiment may be part of an ignition kit.

In yet another embodiment, the "ignition chimney" may be modular. The "ignition chimney" may have sections or modules that may be joined together, creating different sizes and geometries, the sections. The geometries may in some embodiments may be at least partially disposable and/or at least partially reusable. In some embodiments, the sections or modules of the modular "ignition chimney", may be included in a kit.

In some embodiments, the "ignition chimney" and ignition grate may be optimized for different needs, for example, the "ignition chimney" may be shortened to accommodate a single or double layer of briquettes or charcoal and spread out upon ignition grate, the ignition grate may be set to optimally ignite solid fuel in combination with optimally set air supply.

A grill having a fuel grate according to some embodiment of the invention may be included in, a mixed fuel ignition system that includes an ignitor (e.g., ignitor 70). In some embodiments, the kindling or combustible fire starters may be shielded beneath an ignition grate at an optimal position and optimal air supply, and may be ignited using ignitor 70, selected from, for example, a) an integrated burner/igniter and b) an integrated electric ignition system Benefits of the mixed fuel ignition system are multiple, compared to continually supplying fuel to the burner or power to the electric ignition system, while waiting for solid fuel to reach desired state for use, wherein igniting the shielded kindling or combustible fire starters using a burner or electricity is almost instantaneous and requires minimum energy, the system is convenient as it allows a user flexibility and choice regarding ignition needs or in case of malfunctioning burner or electric ignition, beyond convenience, the mixed fuel system is safer, and more economical to use and purchase.

The benefits of the mixed fuel ignition system regarding safety are multiple, compared to conventional gas ignition, a much smaller canister or cartridge may be used, hence in case of a leak or explosion much less damage may occur, as for electric ignition, eliminating the need connecting to grid power, due to low energy consumption, eliminates the possibility of electrocution while enabling convenience of use and mobility.

In some embodiments an electric ignition system may include transforming electric energy to heat, alternatively in some embodiments, method of transforming to heat, comprising at least one of: resistivity, electromagnetic radiation, including concentrated light and etc. or in combination.

In some embodiments, ignitor 70 of the mixed fuel ignition system may include a non-integrated electric ignition, such that at least some of the electric ignition is applied to shielded combustible fire starters or kindling from an external source by user.

In some embodiments, the electric ignition system may be at least one of; integrated to the ignition grate, detachably applied to ignition grate, detachably applied to the cooking or heating assembly, all in combination. In some embodiments, the electric ignition system may reusable, disposable and/or rechargeable.

In some embodiments, ignitor 70 of the mixed fuel ignition system may include at least an integrated lighter, comprising at least one of, arc, plasma, electronic, e-lighter and the like. The lighter may be integrated to at least one of; cooking or heating assembly, ignition grate, compartment and/or shield. The lighter may be rechargeable or make use of rechargeable batteries.

In some embodiments, ignitor 70 of the mixed fuel ignition system may include at least a disposable lighter or at least a reusable lighter.

In some embodiments, ignitor 70 of mixed fuel ignition system may include a non-integrated burner/igniter, such that, the burner/igniter may be applied to shielded fire starters or kindling from an external source by user.

In some embodiments, at least some of the burner/igniter may be integrated to the ignition grate or at least some being detachably connected to the ignition grate, or detachably connected to the cooking or heating assembly.

In some embodiments, the burner/igniter may use any combustible source such as gas, liquified gas, oil or liquid fuel.

In some embodiment, the mixed fuel ignition system may include at least a grid tie electric source.

In some embodiments, the mixed fuel ignition system may include at least one of:

a disposable gas source, a disposable gas burner, a disposable gas igniter, all in combination In some embodiments, the igniter may produce one of; piezoelectric spark, flint wheel, friction spark, chemical reaction or a combination thereof.

In some embodiments, the ignition system may be automatically activated, thereafter inserting the fire starter in the compartment or thereafter closing the shield.

In some embodiments, the kettle or grill assembly may further include at least one of: a) hinged lid, b) non hinged lid and c) lid hanger, The lid may include at least one of; a) integrated lid thermometer, b) an air damper, c) handle, d) a, b, c in combination.

In some embodiments, the mixed fuel ignition system may be included in a retrofit kit.

In some embodiments, the ignition grate may include a “match opening” or an “ignitor opening”. In some embodiments, the “match opening” or “ignitor opening” may allow igniting kindling or combustible fire starters placed at shielded position before or after solid fuel is placed upon the grate using a match or an ignitor. For example, the “match opening” may be positioned at solid fuel outer perimeter and in communication with kindling or fire starters placed at shielded position.

In yet another embodiment the “match opening” may be positioned with respect to at least one of “ignition chimney”, solid fuel sustaining element, ignition basket or other parts of the ignition system or kit.

In some embodiments herein, the igniter may operate by any combustible source as disclosed herein above.

In some embodiments, the “igniter opening” or the “match opening” may be adjusted to ignite combustible material placed in grate spacing, compartment shield spacing or compartment spacing.

In some possible embodiment the “optimal combustible fire starter” may be adopted to be placed in a specific positioning and orientation within the shielded compartment, for example, the fire starter may have at least a projection extending towards the compartment, therein securing positioning, in yet another example a projection may arise off the compartment or shield therein positioning starter within the compartment.

In some embodiments, the “optimal combustible fire starter” may extend from at least one of; shield, cavity, grate.

In some embodiments, the “optimal combustible fire starter” may include at least an ignition region, such that the region may enable spreading the ignition to other regions (e.g., in the solid fuel) or spreading the ignition rapidly to other regions.

In some embodiments, the “optimal combustible fire starter” may include an igniter integrated into the fire starter, for example, as a part of a kit.

In some embodiments, the “optimal combustible fire starter” may include optimal air ways, such as, one of; air openings, air passages, air ducts or in combination. The air openings may be aligned with the grill air supply.

In some embodiments, the “optimal combustible fire starter” may cover at least a portion of the ignition surface (e.g., surface 20) included in the compartment. Alternatively, the “optimal combustible fire starter” may extend beyond the compartment, allowing igniting solid fuel such as charcoal or briquettes in a flattened position. For example, the fire starter may have the shape of a disk or other suitable shape and in some embodiments manufactured comprising at least one of; gel, solid, pellet, powder or in combination.

In some embodiments, the “optimal combustible fire starter” a plurality of different types of fire starters. In some embodiments, the “optimal combustible fire starter” may be modular, having several modules. The modules may be of same material or manufacturing process or not, the modular fire starter may allow customizing ignition varying types of fuels and positions, in some embodiments the modules may be stackable. In some embodiments, the “optimal combustible fire starter” may include different sections made from the same material or manufacturing process or not. The sections may be separated for convenience and optimizing ignition process.

In yet another embodiment, the “optimal combustible fire starter” when combined with the “mixed fuel ignition system” may be recessed or divided, allowing optimal positioning with integrated burner/igniter or electric ignition system.

In some embodiments, the fire starter may further include a supporting structure made of a non-ignitable material such as metal and be some disposable or some reusable and part of an ignition kit or system.

Alternatively, the fire starter may be hung beneath the grate or cover, wherein hanger comprising a non-ignitable material such as metal and be some disposable or some reusable and part of an ignition kit or system.

For example, the fire starter may include a mixture of wood and paraffin. The wood material may be of different character, for example, wood chips, particles, sawdust, shavings, fiber, paper etc., and the paraffin may include wax, oil etc.

In some embodiments, the fire starter may include at least one of: corn starch, rosin, tallow, varnish, turpentine, and others.

In some embodiments, the fire starter may be at least some ignitable liquid or at least some ignitable gel.

As should be understood by one skilled in the art, the fire starter materials disclosed herein are given as nonlimiting examples only. The invention as a whole is not limited to any specific fire starter material, shape, size of phase.

In accordance with some embodiments, a scalable and flexible ignition system or kit may include at least one of; a cooking or heating assembly wherein assembly comprising at least a “top access shielded compartment”, an “optimal combustible fire starter”, an “ignition chimney”, a “solid fuel insert”, a “mixed fuel ignition system” or all in combination.

In some embodiments, the optimally arranged solid fuel insert may include charcoal or briquettes arranged or prearranged at particular geometries and delivering a particular heat output, for example, the coal or briquettes may be arranged as a single layer, covering the entire grate or only some, depending on particular fuel type, allowing a particular heat output over time or in some combinations allowing a combination of heat outputs at different regions of the grate The invention yet further discloses, supplied air, combustible fire starters or kindling, and a “solid fuel insert”, positioned relative or aligned one another.

The disclosed invention is not to be limited by what is referenced and may be extended to include both combinations and sub combination.

While the disclosed application mostly references the invention as it is implemented mostly with barbeques, grills, kettles, manuals and smokers, it is not to be limiting in any way, and is to be understood in the broadest sense, for example, the invention may further be used with other cooking, heating or cooking/heating combinations such as boilers, boiler stove, wood stove, fireplace, solid fuel cookers, ovens etc.

Additionally, the disclosed invention may find useful with double walled kettles or grills, ceramic grills and cookers, pellet grills as well as fire pits, heating and cooking stoves fireplaces and alike.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A fuel grate for a grill comprising: a solid fuel support grate configured to fit within an internal cavity of the grill, the solid fuel support grate comprising a cover having an opening; and at least one fuel ignition surface independent of the cover, the ignition surface being configured to be placed at a predetermined set distance or optimal position from the solid fuel support grate in the internal cavity of the grill;

wherein the at least one fuel ignition surface is permanently connected to the solid fuel support grate via one or more connection elements to form a single integrated element;

wherein the cover is configured to shield a combustible fire starter, and the opening is configured to allow secure placement of the fire starter on the ignition surface in a shielded position relative to the solid fuel placed on the solid fuel support grate; and wherein the predetermined distance is selected to allow placement of a quantity of combustible fire starter sufficient to ignite the solid fuel.

2. The fuel grate of claim 1, wherein the area of the at least one fuel ignition surface is at least 30% of the area of the solid fuel support grate.

3. The fuel grate according to claim 1, wherein the at least one fuel ignition surface is configured to hold solid or liquid combustible fire starters and comprises a solid plate, perforated plate, non-flat surface, or grate structure.

4. The fuel grate according to claim 1, comprising or functionally associated with an ignitor configured to ignite a combustible fire starter positioned on the at least one fuel ignition surface, the ignitor optionally including one or more of an electric arc source, plasma ignitor, electronic lighter, resistive heating element, or gas-fueled ignition source, the ignitor or one or more of its components optionally being reusable, disposable, and/or rechargeable.

5. A solid fuel ignition assembly comprising the fuel grate of claim 1 and a combustible fire starter, wherein the combustible fire starter comprises a specially-designed fire starter or optimal combustible fire starter configured to cooperate with the at least one fuel ignition surface, the fire starter optionally being solid, liquid, gel, pellet-based, or composite; wherein, in some embodiments, the specially-designed fire starter comprises an outer or contact surface shaped or sized to mate with, rest upon, or engage the fuel ignition surface when positioned thereon; wherein the specially-designed fire starter is optionally positioned on, connected to, or otherwise arranged relative to the fuel ignition surface and/or aligned with or offset relative to one or more air supply vents or dampers to facilitate airflow during ignition; and wherein the specially designed fire starter optionally includes or is associated with a cover or shield portion configured to protect, contain, or position the fire starter beneath the solid fuel or relative to the fuel ignition surface, the cover being reusable, semi-disposable, or disposable.

6. The fuel grate according to claim 1, wherein the solid-fuel support grate comprises one or more solid-fuel sustaining elements assembled on or permanently or detachably applied to the solid-fuel support grate to define designated locations for placement of solid fuel, the one or more solid-fuel sustaining elements optionally comprising separators, fences, cages, shields, perforated shields, grates, bottomless ignition chimney, or any combination thereof, the solid-fuel sustaining elements being reusable, semi-disposable, or disposable.

7. The fuel grate according to claim 1, wherein the at least one fuel ignition surface comprises one or more separators assembled on or permanently or detachably applied to the solid fuel ignition surface to define at least two locations at which fire starters are to be placed, the one or more separators comprising at least one of: a solid plate, perforated plate, non-flat surface, or grate structure, or any combination thereof, the separators being reusable, semi-disposable, or disposable.

8. The fuel grate according to claim 1, further comprising a solid fuel insert configured to be positioned on, supported by, or detachably connected to the solid fuel support grate, the solid fuel insert comprising: one or more solid fuel sustaining elements selected from separators, fences, cages, shields, perforated shields, and grate structures; and charcoal, briquettes, or wood arranged or pre-arranged within the solid fuel insert in a predetermined geometry, including a single layer covering all or part of the solid fuel support grate, the geometry being selected to deliver a particular heat output over time or to provide differing heat outputs in different regions of the grate; wherein the solid fuel insert is configured to be partially disposable and partially reusable, or wholly disposable, and optionally comprises at least a metal wire net or metal sheet securing the charcoal, briquettes, or wood as part of an ignition kit or system.

9. A kit for igniting solid fuel, comprising: (a) at least one component selected from the group consisting of: (i) a fuel grate according to claim 1; (ii) a replacement or auxiliary cover configured to cooperate with or replace a cover of the fuel grate, wherein the cover optionally being disposable, semi-disposable, reusable; (iii) the ignitor according to claim 4; (iv) a specially designed fire starter according to claim 5; (v) a solid-fuel sustaining element according to claim 6; (vi) a separator according to claim 7; and (vii) a solid-fuel insert according to claim 8; and (b) optionally, one or more components selected from the group consisting of: (i) a combustible fire starter, charcoal, briquettes, or wood; (ii) a charcoal basket; (iii) a chimney type starter; (iv) an air-flow regulator including an ash cleaner, a damper, a rotatable ash-cleaner and/or damper assembly, or an ash catcher; (v) a cartridge, handheld lighter, burner, or portable ignition device; (vi) a food-sustaining surface such as a grate or griddle; (vii) a packaging or container configured for assembly, storage, or retail distribution of the kit; and wherein the kit is packaged as a unit for retail sale, consumer distribution, or as a modular system in which one or more components are sold separately but designated for use together.

10. A cooking or heating assembly configured to combust solid fuel, comprising: a housing defining an inner cavity; and a fuel grate according to claim 1 positioned within the inner cavity and configured to support the solid fuel; wherein the assembly optionally includes: (i) at least one cooking grate disposed above the fuel grate; (ii) an air-ventilation system or air vent configured to introduce air into the inner cavity to facilitate ignition and combustion of the solid fuel, optionally including a damper configured to regulate airflow to control cooking temperature; (iii) a rotatable ash cleaner and/or damper configured to remove ash and simultaneously regulate airflow to the solid fuel; (iv) an ignitor as defined in claim 4, operably coupled to the fuel grate or otherwise arranged within the grill assembly to ignite a combustible fire starter positioned on the fuel ignition surface, wherein at least a portion of the ignitor is mounted on the fuel grate, the grill, or both, and the ignitor optionally comprising at least one of: an electric arc, plasma source, electronic lighter, or gas ignition source; and (v) one or more additional optional features selected from: (a) a lid; (b) an ash catcher; (c) a thermometer; (d) supporting legs, optionally foldable; (e) one or more handles; (f) a hanger; (g) a foldable or side table; (h) wheels; (i) a charcoal bin; (j) a gas burner for igniting solid fuel; (k) an electric ignitor for igniting solid fuel; (l) a rotisserie; and any combination thereof.

11. A fuel grate for a grill comprising: a solid fuel support grate configured to fit into an internal cavity of the grill, the solid fuel support grate comprising a cover having an opening; wherein the opening is configured to allow insertion of at least one of: (i) a combustible fire starter; or (ii) a specially designed fire starter or an optimal combustible fire starter; through the solid fuel support grate without removing the solid fuel support grate; and a fuel ignition unit configured to hold the combustible fire starter, the specially designed fire starter, or the optimal combustible fire starter, the fuel ignition unit comprising at least one fuel ignition surface and a receiving portion configured for placement of said fire starter; wherein the fuel ignition unit is configured to be: (a) supported by or detachably connected to the solid fuel support grate; (b) supported by or detachably connected to a housing of the grill; or (c) supported by, detachably connected to, or permanently connected to an internal component of the grill distinct from the solid fuel support grate, including an ash cleaner or damper; such that the fuel ignition unit is maintained at a predetermined distance or optimal position from the solid fuel support grate to allow placement of a quantity of said fire starter sufficient to ignite solid fuel placed on the solid fuel support grate; wherein the cover is configured to shield said fire starter.

12. The fuel grate of claim 11, wherein the internal component comprises an ash cleaner, a damper, or a combined rotatable ash cleaner and damper mechanism, said mechanism being formed as a unitary structure or a multipart assembly; wherein the fuel ignition unit or fuel ignition surface is configured to be positionable on, integrated with, or used in combination with said mechanism or a component thereof;

and wherein the at least one fuel ignition surface is configured to hold solid or liquid combustible fire starters and comprises at least one of a solid plate, perforated plate, non-flat surface, or grate structure.

13. The fuel grate of claim 11, wherein the fuel ignition unit comprises, or is at least partially formed of, a flexible, non-rigid support formed of multiple interconnected metal elements arranged to provide a mesh-like or net-like surface configured to hold the combustible fire starter while permitting airflow, and wherein the fuel ignition unit is dimensionally adjustable between at least two configurations, including a reduced-height or reduced-depth configuration for storage, transport, or installation.

14. The fuel grate of claim 11, wherein the area of the at least one fuel ignition surface is at least 30% of the area of the solid fuel support grate.

15. A solid fuel ignition assembly comprising the fuel grate of claim 11 in combination with a combustible fire starter, specially designed fire starter, or optimal combustible fire starter configured to cooperate with the at least one fuel ignition surface; wherein the fire starter is solid, liquid, gel, pellet-based, or composite;

wherein the specially designed or optimal fire starter comprises an outer or contact surface shaped or sized to mate with, rest upon, or engage the fuel ignition surface when positioned thereon; and wherein the specially designed or optimal fire starter is configured to be positioned on, connected to, or arranged relative to the fuel ignition surface and aligned with or offset relative to one or more air supply vents or dampers to facilitate airflow during ignition.

16. The solid fuel ignition assembly of claim 15, wherein the specially designed fire starter further comprises a cover or shield portion configured to protect, contain, or position the fire starter beneath the solid fuel or relative to the fuel ignition surface, the cover being reusable, semi-disposable, or disposable.

17. A specially designed or optimal combustible fire starter for use with the fuel grate of claim 11, comprising: a combustible fuel body comprising fuel material selected from solid, liquid, gel, pellet-based, or composite materials; wherein the combustible fuel body comprises an outer or contact surface shaped or sized to mate with, rest upon, or engage the receiving portion or the at least one fuel ignition surface of the fuel ignition unit of claim 11; wherein the combustible fuel body is configured to be positioned on, connected to, or otherwise arranged relative to the fuel ignition unit such that the fire starter is stabilized and aligned with or offset relative to one or more air supply vents or dampers of the grill to facilitate airflow during ignition; and wherein the combustible fuel body optionally includes or is associated with a cover or shield portion configured to protect, contain, or position the combustible fuel body relative to the fuel ignition unit, the cover being reusable, semi-disposable, or disposable.

18. The fuel grate of claim 11, wherein the opening is dimensioned to allow insertion of the fuel ignition unit through the solid fuel support grate for placement onto the housing or the internal component of the grill.

19. The fuel grate according to claim 11, comprising or functionally associated with an ignitor configured to ignite the combustible fire starter, specially designed fire starter, or optimal combustible fire starter positioned on the at least one fuel ignition surface; wherein the ignitor optionally includes one or more of an electric are source, plasma ignitor, electronic lighter, resistive heating element, or gas-fueled ignition source; and wherein the ignitor or one or more of its components is optionally reusable, disposable, and/or rechargeable.

20. The fuel grate according to claim 11, further comprising at least one of: (a) one or more solid-fuel sustaining elements assembled on or permanently or detachably applied to the solid-fuel support grate to define designated locations for placement of solid fuel, the one or more solid-fuel sustaining elements comprising separators, fences, cages, shields, perforated shields, grates, bottomless ignition chimney, or any combination thereof; or (b) one or more separators assembled on or permanently or detachably applied to the fuel ignition surface to define at least two locations at which fire starters are to be placed, the one or more separators comprising a solid plate, perforated plate, non-flat surface, grate structure, or any combination thereof; wherein said elements or separators are optionally reusable, semi-disposable, or disposable.

* * * * *